United States Patent Office 3,364,157
Patented Jan. 16, 1968

3,364,157
DIISOCYANATE COUPLING OF OXYMETHYLENE POLYMER AND DISSIMILAR ORGANIC POLYMER
George W. Halek, New Providence, and Frank M. Berardinelli, South Orange, N.J., assignors to Celanese Corporation, a corporation of Delaware
No Drawing. Filed June 30, 1964, Ser. No. 379,357
15 Claims. (Cl. 260—13)

ABSTRACT OF THE DISCLOSURE

Disclosed herein is a method of coupling oxymethylene polymers comprising the utilization of an isocyano or isothiocyano group. It is preferred that the bifunctional material be employed.

---

This invention relates to block and graft copolymers containing at least one segment of an oxymethylene polymer.

Oxymethylene polymers having recurring —CH$_2$O— units have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of cationic catalysts, including such compounds as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thionyl chloride, fluorosulfonic acid, phosphorus trichloride, titanium tetrachloride, ferric chloride, zirconium tetrachloride, aluminum trichloride, stannic chloride, stannous chloride, and the alkane sulfonic acids as ethane sulfonic acid and methane sulfonic acid.

The preferred catalysts are boron fluoride and the boron fluoride complexes with water (such as boron fluoride monohydrate, boron-fluoride dihydrate, and boron fluoride trihydrate) and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfide, and ethyl mercaptan.

Suitable catalysts are disclosed in U.S. Patents 2,989,505, 2,989,506, 2,989,507, 2,989,508, 2,989,509; all of Donald E. Hudgin and Frank M. Berardinelli; 2,989,510, of George J. Bruni; 2,989,511 of Arthur W. Schnizer, and in the article by Kern et al. in Angewandte Chemie, 73, pp. 176–186 (Mar. 21, 1961).

Oxymethylene polymers of improved thermal stability may be prepared by introducing into the polymer chains or attaching to the ends of the polymer chains, structures which are resistant to thermal detachment. The polymers may incorporate interspersed oxyalkylene units with adjacent carbon atoms and preferably oxyethylene units as disclosed in U.S. Patent No. 3,027,352 of Walling, Brown and Bartz. Copolymers of this type may be described as having at least one chain containing oxymethylene (—CH$_2$O—) units (usually at least 85 mol percent) interspersed with (—OR—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically unsaturated compounds such as styrene, divinyl ether, vinyl acetate, vinyl methyl ketone or acrolein as disclosed in the aforementioned article by Kern et al. The polymers may be end capped as, for example, by acylation or etherification after polymerization or during polymerization by the use of selected chain transfer agents.

As used in the specification and claims, the term "oxymethylene polymers" denotes homopolymers and copolymers (including terpolymers, etc.) having at least 60% recurring oxymethylene units, and further includes substituted oxymethylene polymers, wherein the substituents are inert, i.e., do not participate in undesirable side reactions.

For some applications molecular modification of oxymethylene polymers is desirable to provide polymers of modified strength characteristics, flow characteristics, solvency, crystallinity, thermal stability, etc. Such molecular modification is particularly desirable where property modification by blending two polymers is impossible as, for example, by polymer incompatibility.

It has now been found that such modified oxymethylene polymers may be prepared by the reaction of an isocyano (—NCO) or isothiocyano (—NCS) terminated polymer with a polymer having a terminal or pendant group containing active or acidic hydrogen as determined by the Zerewitnoff method.

The copolymers may also be prepared by the coupling reaction of polymeric segments, at least one of which is an oxymethylene polymer, in the presence of a bifunctional coupling agent, and preferably those having a least one isocyano or isothiocyano group. In such a reaction system, an isocyano or isothiocyano prepolymer may be generated in situ, where a reaction with one polymeric segment is preferential over another, or coupling may occur through substantially simultaneous reactions of the coupling agent with the polymeric material.

Thus, the copolymers may be provided by the coupling of the polymeric chains in reaction with a bifunctional compound having at least one isocyano or isothiocyano group or by the reaction of a separately prepared isocyano or isothiocyano terminated prepolymer with another polymeric chain having a terminal or pendant group containing active or acidic hydrogen.

The presence of acidic hydrogen may be determined by the Zerewitnoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of liberated methane may be collected and measured, and the number of active hydrogen atoms per mol determined, where the molecular weight is known. A further description of the Zerewitnoff test including modifications of the procedure for various applications, can be found in Grignard Reactions of Non-Metallic Substances, Kharasch, M. S., and Reinmuth, O. (Prentice-Hall, Inc., New York, 1954), pp. 1166–1174.

Suitable substituents containing active hydrogen include amino, amido, hydroxy, carboxy, mercapto, thiocarbonyl, —CSNH$_2$, —SO$_2$NH$_2$, —SO$_2$OH, etc. Generally, substituents containing active or acidic hydrogen atoms are polar, due to their inclusion of atoms more electronegative than carbon, such as oxygen or nitrogen.

Substituents containing active hydrogen react with the isocyano or isothiocyano groups in the following manner:

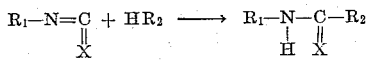

Thus, the copolymers contain the structure:

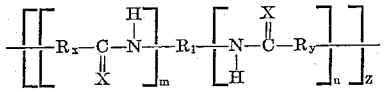

wherein $R_x$ is an oxymethylene polymer segment, X is an oxygen or sulfur atom; $R_1$ is an organic radical derived from the coupling agent, and preferably represents a divalent aliphatic,[1] cycloaliphatic,[2] or aromatic[3] moiety, including the substituted derivatives thereof, having up to about 20 carbon atoms; $R_y$ is any suitable organic polymeric segment; $m$ and $n$ are integers from one to two, and $m+n$ is an integer from two to three. The copolymers may, of course, comprise one or more such block structures, as indicated by the subscript Z which is an integer from 1 to 100. $R_x$ and $R_y$ represent the residue of a polymer containing functional groups having active hydrogen atoms, and resulting from abstraction of the active hydrogen atoms from the aforesaid functional groups forming the termini of the designated polymeric segment. Thus, it is to be understood that in the specification and claims the polymeric segments $R_y$ and $R_x$ are inclusive of the pendent or terminal group through which the polymeric segment is bonded to the

group of the coupling agent.

For example, where the terminal group of the polymeric segment is a hydroxy group, reaction with a diisocyanate will result in the structure:

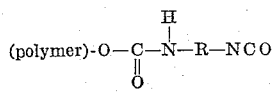

(where $R_x$ or $R_y$ would represent

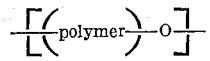

Similarly, where the terminal group is an amino group, reaction with a diisocyanate will result in the structure:

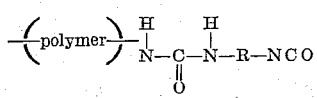

---

[1] Aliphatic being defined as saturated and unsaturated (nonbenzenoid) hydrocarbons and their substituted derivatives, having an open chain structure; inclusive of the paraffin, olefin, and acetylene hydrocarbons and further including compounds containing a minor proportion of heteroatoms, selected from the group consisting of oxygen, sulfur, and nitrogen, in the open chain structure; distinguished from aromatic, and cyclic compounds.
[2] Cycloaliphatic being defined identically to 1, supra, with the exception that the term encompasses the cyclic aliphatic structures, including the heterocyclics where the heteroatoms are present in minor proportion; distinguished from the open chain aliphatics and the aromatic compounds.
[3] Aromatic being defined as hydrocarbons and their substituted derivatives having at least one ring having benzenoid unsaturation; inclusive of monocyclic, bicyclic, and polycyclic hydrocarbons and those compounds having a minor proportion of heteroatoms selected from the group consisting of oxygen, sulfur, and nitrogen; distinguished from aliphatic and cycloaliphatic compounds.

and $R_x$ or $R_y$ would represent

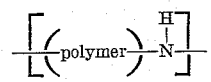

In the case of a carboxy terminal group, the resulting structure is

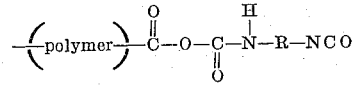

and $R_x$ and $R_y$ would represent

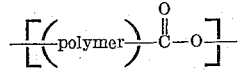

While a representation of the poylmeric segments as inclusive of the substituent group is preferable considering the wide variety of groups containing active hydrogen which form the direct bond between the polymeric segment and the bifunctional coupling agent, a more limited class of block copolymers may be represented by the structure:

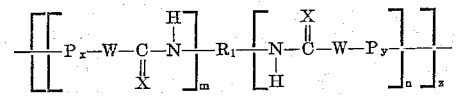

where W is oxygen, sulfur,

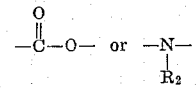

where $R_2$ may be hydrogen, alkyl having one to five carbon atoms, or halogen, $P_x$ is an oxymethylene polymer segment, $P_y$ is any suitable organic polymeric segment, and all other symbols are the same as described above.

Representative organic polymeric materials suitable for the co-polymer block thus include those having hydroxy, amino, amido, carboxy, mercapto, thiocarbonyl or other active hydrogen containing substituents, such as the polyethers, including, for example, the polymers and copolymers derived from ethylene glycol; propylene glycol; butylene glycol; pentamethylene glycol; heptamethyene glycol; octamethylene glycol; nonamethylene glycol; decanediol; 1,2-propylene glycol; 1,4-butylene glycol; 1,6-hexanediol; methylhexanediol; 1,4-butenediol; 2,2-dimethyl-1,3-propylene glycol; polystyrene glycol; the polyacetals, such as the polyoxymethylenes; the polyether-polyacetals such as the copolymer of ethylene oxide and trioxane; cellulose and its derivatives, such as the cellulose esters; polyesters (containing both hydroxy and carboxy groups), such as polyethylene terephthalate, poly (1,4-cyclohexanedicarbinyl terephthalate); polytetramethylene sebacate; the polycarbonates, such as poly [2,2-propanebis (4-phenyl carbonate)]; polyamides, such as the polysulfonamides, polycarbonamides, such as polyhexamethylene diamine adipate and the corresponding N-methoxylated polymers, etc; mercapto containing polymers, such as the polythiomethylenes; the polyurethanes and mixtures and copolymers of the foregoing. Of course, each of the foregoing polymers may contain hydroxy, amino, etc. substituent groups at the terminus of the polymeric chain or at some intermediate position. Moreover, suitable polymers include those having a variety of active hydrogen containing substituents.

Thus, the suitable polymeric co-blocks include those having a polymeric backbone consisting of recurring atoms selected from the group consisting of oxygen, sulfur, carbon and nitrogen atoms comprising the hydrocarbon, oxahydrocarbon, thiahydrocarbon, amino hydrocarbon saturated and unsaturated polymers, etc. and which contain active-hydrogen-containing groups bonded to aliphatic, cycloaliphatic, and aromatic groups, including those containing heteroatoms selected from the group consisting of nitrogen, oxygen and sulfur, (e.g. polyethylene glycol contains hydroxyaliphatic terminal groups; polyethylene terephthalate contains carboxyaromatic groups and hydroxyaralkyl groups; the polythiomethylenes contain mercaptoalkyl terminal groups; polyethylene diamine contains aminoaliphatic groups; the cellulose esters contain glucopyranose units having hydroxy groups bonded to an alkylheterocyclic moiety (where the hetero atom is oxygen( and hydroxy groups directly bonded to the heterocyclic moiety; the polycarbonates contain hydroxy-aromatic groups etc.

Similarly, while up to as much as 100% of the polymeric chains of the oxymethylene polymers may contain terminal hydroxymethyl or hydroxyalkyl groups (i.e., hydroxy bonded to methylene or higher alkylene groups) the oxymethylene polymers may also contain active hydrogen-containing groups bonded to or adjacent copolymeric units derived from the comonomers described above and in the aforementioned article by Kern et al (including lactones, carbonates, cyclic acid anhydrides, styrene, divinyl ether, vinyl acetate, vinyl methyl ketone, acrolein, etc.) Also, the terminal groups may be altered by the presence of appropriate chain transfer agents in the polymerization reaction, or by reaction of the polymer with end-capping agents to provide terminal ester, ether, urethane or thiourethane terminal groups. Suitable chain transfer agents include certain formaldehyde impurities such as methanol, formic acid, and water; the agents disclosed in U.S. Patent 3,017,389 of Langsdorf et al., incorporated herein by reference, and including certain carboxylic acids and esters, certain aliphatic alcohols, cycloaliphatic alcohols, aromatic alcohols, carboxylic acid anhydrides, amines, imines, halides, carbonates, silicates, phosphites, thiophanes, aralkyl ethers, sulfides, cyclic sulfoxides, etc.; and the agents disclosed in application Ser. No. 89,371 filed Feb. 15, 1961, by Arthur W. Schnizer, Walter E. Heinz, and Robert M. Seddon and incorporated herein by reference, including certain acetals, hemiacetals, alcohols, carboxylic acids and carboxylic acid anhydrides. Suitable end-capping agents include various organic acids and anhydrides, acyl halides, ketenes, ketene dimers, alcohols, alpha chloroalkyl ethers and their quaternary salts, alkyl halides, epoxides, diazomethane, orthoesters, orthocarbonates, ketals, acetals, alkyl sulfates, alkyl borates, alkyl silicates, alkyl titanates, and alkyl and aryl mono or diisocyanates or isothiocyanates, as further disclosed in Kern et al., Angewandte Chemie, 73, pp. 177–186 (1961), and Sittig, M., Hydrocarbon Process and Petroleum Refiner 41, pp. 131–170 (1962).

While in certain instances, high molecular weight polymers (i.e., having a number average molecular weight of at least 10,000) may be preferred, where property alteration of greater magnitude is desired the lower molecular weight (e.g., between about 1,000 and about 10,000 number average molecular weight) polymers are preferred, since the incorporation of the low molecular weight species (in equal amount to the percent incorporation of a higher molecular weight species) results in a greater number of moles of polymer incorporated i.e., the resulting copolymer contains to a greater degree a structure of alternating dissimlar polymeric segments.

Particularly preferred polymeric co-blocks are the cellulose esters preferably having an inherent viscosity determined as a 0.1% solution in a 0.5 M soln. of cupri ethylene diamine of between about 1.0 and about 2.0; an acetyl value of between about 50% and 62%, or a hydroxyl value between about 0.1/3.0 and 0.8/3.0 and particularly the cellulose esters having a molecular weight greater than 5000; the polyesters, such as polyethylene terephthalate and polyalkylene glycol adipates, preferably having a hydroxyl value between about 0.1% and 2.0%, a carboxyl value between about 0.2 and 5% (or any combination thereof); the polyalkylene glycols, having a molecular weight between about 350 and 20,000; the polycarbonates, and particularly the polycarbonate of phosgene and bisphenol-A.

In the most preferred embodiment, the oxymethylene polymer block is an oxymethylene copolymer which may be described as having at least one chain containing oxymethylene ($—CH_2O—$) units (usually at least 85 mol percent) interspersed with up to about 15 mol percent of ($—OR—$) units, wherein R is a divalent radical containing at least two carbon atoms directly linked to each other and positioned in the chain between the two valences, with any substituent in the R radical being inert. Suitable such copolymers may have a number of average molecular weight of from about 1000 up to about 80,000 or higher, with inherent viscosities ranging from about 0.2 to about 1.5 or higher. Dependent upon the type and extent of property modification sought, the low molecular weight, e.g. 1000 to 10,000 or the high molecular weight 30,000 to 80,000 species may be preferred. These copolymers are more fully disclosed in U.S. Patent No. 3,027,352 of Walling, Brown and Bartz, incorporated herein by reference.

For chain extension, the polymers optimally contain no more than two active hydrogen atoms, preferably located at the termini of the polymeric chain. However, suitable polymers also include those having a plurality of active hydrogen atoms located in various positions on the polymeric chain. For example, such polymers are suitable for chain extension where the terminal active hydrogen atoms are more reactive than any located on the polymeric chain between the terminal positions, and may be particularly useful when a chain extended block copolymer capable of further crosslinking is desired. Of course, for a given molecular weight, increased functionality acts to increase the rate of polymer crosslinking.

The coupling agents are suitably bifunctional compounds having at least one isocyano ($—NCO$) or isothiocyano ($—NCS$) group, and preferably are organic diisocyanates, ($OCN—R—NCO$), diisothiocyanates $$(SCN—R—NCS)$$

or isocyanateisothiocyanates ($OCN—R—NCS$), but may also be of higher functionality (e.g. triisocyanates, polyisocyanates, etc.).

A preferred class of coupling agents has the general formula R $(—NCX)_n$ wherein X is an atom selected from the group consisting of oxygen and sulfur, $n$ is an integer between 1–3, and R is an organic radical derived from the group consisting of aliphatic, cycloaliphatic and aromatic moieties (defined as at page 5), having one to twenty carbon atoms, and substituted derivatives thereof, where the substituents are inert i.e., do not participate in undesirable side reactions.

Suitable compounds include, for example, aromatic diisocyanates, such as 2,4 toluene diisocyanate; 2,6 toluene diisocyanate; 1,6 toluene diisocyanate; diphenyl methane 4,4′ diisocyanate; 3,3′ dimethyl diphenyl methane 4,4′-diisocyanate; 3,3′ dimethyl 4,4′ diphenylene diisocyanate (3,3 bitoluene 4,4′ diisocyanate); m-phenylene diisocyanate; p-phenylene diisocyanate; o-phenylene diisocyanate; methane diisocyanate; chlorophenylene-2,4-diisocyanate; chlorophenylene 2,4 toluene diisocyanate; 3,3′ dichlorodiphenyl-4,4′-diisocyanate; 4 chloro-1,3-phenylene diisocyanate; xylene 1,4 diisocyanate; dixylylene methane 4,4′ diisocyante; 1,5 naphthalene diisocyanate, 1,4 naphthalene diisocyanate, and the corresponding diisothiocyanates and the isocyanateisothiocyanates; alkylene diisocyanates, such as 1,6 hexamethylene diisocyanate; 1,2 ethylene diisocyanate; 1,3-propylene diisocyanate; 1,4 tetramethylene diisocyanate; 1,5 pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cyclo aliphatic diisocyanates, such as 1,3 cyclohexylene diisocyanate; 1,3 cyclopentylene diisocyanate;

1,4 cyclohexylene diisocyanate; 4,4′ methylenebis-(cyclohexyl isocyanate) and the corresponding diisothiocyanates and isocyanate-isothiocyanates; triisocyanates, such as triphenyl methane triisocyanate; 1,3,5 benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Aromatic diisocyanates, especially derivatives thereof having electronegative substituents are particularly desirable, due to their increased reactivity. The electronegative substituents, such as, for example, $-NO_2$, $-C\equiv N$, $-CHO$,

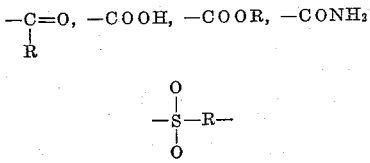

and $-CF_3$ groups, apparently assist the polymerization tendency of the isocyano or isothiocyano groups. The differing reactivities of the isocyano groups may be used to advantage in certain applications. Generally, the reactivity of the second isocyano group decreases upon reaction of the first (e.g. in phenylene diisocyanate, the second isocyano group reacts about half as fast as the first such group to react).

Other bifunctional coupling agents are the combinations of a biscarbamyl chloride of a diprimary diamine and a diprimary amine, and phosgene and a diprimary diamine.

While a catalyst is not always required, the coupling reaction or chain extension process may be catalyzed by any otherwise suitable basic substance, free of interfering active hydrogen atoms, such as the alkali metals e.g. sodium, the alkali metal alkoxides, Friedel-Craft metal halides, etc. A preferred class is the tertiary amines, including such compounds as triethylamine, tributylamine, triethanolamine. The basic catalysts may also act as acid acceptors reducing any possible degradation during the coupling process and may be provided in excess amounts for the performance of this additional function.

The reaction medium is preferably substantially anhydrous and/or the reactants added in substantially anhydrous form although small amounts of water such as may be present in commercial reactants will still provide an operable system, provided that the isocyano or isothiocyano groups are not substantially completely hydrolyzed and rendered incapable of further reaction.

Emulsion, suspension, or solution systems are suitable but higher reaction rates are generally available in solution systems, employing inert solvents for the oxymethylene polymer and/or the coupling agent. Solvents capable of dissolving large quantities of oxymethylene polymers are preferred to optimize reaction rates. Suitable solvents are, for example, dimethylformamide, dimethylacetamide and dimethylsulfoxide.

In solution systems the lowest temperatures consistent with convenient solubility are employed, generally between about 0 and 250° C. Temperatures between about 100 and 175° C. and preferably between about 120 and 150° C. are generally employed with the preferred oxymethylene copolymers. Side reactions involving the formation of allophanates and biurets increase at higher temperatures and therefore the lower temperature ranges are generally preferred. While atmospheric pressures are preferable for ease of operation, lower and higher pressures, e.g., 0 to 1,000 p.s.i. are also suitable.

Melt systems may also be employed in the practice of this invention, and are preferred where it is desirable to optimize reaction rates and obviate certain product recovery operations such as precipitation or filtration. Since it may be desirable for either polymer or both polymers to be in the melt state during the reaction, suitable temperatures are in the range from the softening point of the lower melting polymer to the decomposition temperature of the higher melting polymer. Generally, temperatures between about 60° and 275° C. are employed, with the range of about 150° to about 250° C. being preferred for a melt state of the preferred oxymethylene copolymers. As is the case with the fluid reaction systems described above, lower temperatures in the suitable ranges are particularly preferred, and lower or higher pressures may be employed, although atmospheric is preferred.

The polymers may be provided in any molar ratio to allow variable modification in properties. For example, a 1:1 block copolymer of an oxymethylene polymer and a polyglycol may exhibit desirable properties, or it may be desirable to prepare an oxymethylene block copolymer having bonded thereto outer segments of a polyether requiring a different molar ratio for its preparation. The amount of polymeric reactants provided may be varied at the original addition to the reaction zone, or an additional amount of an original reactant or even another reactant may be added during the course of the reaction. Similarly, additional catalyst and/or coupling agent may be advantageously provided during the course of the reaction.

While the coupling agent may be provided in variable amounts (e.g., to effect further reaction, or to provide isocyano or isothiocyano termination), the reagent is preferably provided in amounts between 0.5 mol and 3.0 mols (of isocyano, or isothiocyano groups per mol of active hydrogen, defining one gram atom of active hydrogen as equal to one mole thereof). For chain extension, amounts between about 0.8 to 1.2 moles per mol active hydrogen of the polymeric block are preferably employed. An excess over the 1:1 stoichiometric ratio favors termination of the polymeric segments over coupling and at a molar ratio of 2:1 (i.e. isocyano/active hydrogen) substantially no coupling occurs. Therefore, where an isocyano or thiocyano terminated prepolymer is to be prepared, an excess over the 1:1 stoichiometric ratio and preferably a 2:1 or more excess is desirable.

The catalysts may be provided in amounts from about 0.001 to 10 weight percent, and preferably between about 0.05 and 1 weight percent based upon the weight of polymer. However, an excess of catalyst may be provided in order to act as an acid acceptor, removing any acids formed in the reaction system, and thereby preventing any possible acidic degradation of the polymeric chain.

Oxymethylene copolymers having interspersed carbon-to-carbon linkages may be stabilized by degrading the unstable end portions of the molecules consisting of successive terminal oxymethylene groups until a stable terminal group having a carbon-to-carbon linkage, (e.g., an oxymethylene terminal group) is reached. The degradation may be thermal degradation, as disclosed in U.S. Patent 3,103,499 of Dolce and Berardinelli on Apr. 2, 1959, or by hydrolysis, as disclosed in application Ser. No. 102,097, continuation-in-part of application Ser. No. 23,658 filed by Berardinelli on Apr. 21, 1960. The preferred block copolymers of this invention may be stabilized by either of these methods, where the oxymethylene copolymer forms an outer segment of the polymeric chain. Stabilization by hydrolysis is preferred.

The terminal degradation rate of the preferred block copolymers of this invention is reduced by the incorporation of chemical stabilizers. One suitable stabilizer system is a combination of an anti-oxidant ingredient such as a phenolic antioxidant and most suitably a substituted bisphenol, and an ingredient to inhibit chain scission, generally a compound or a polymer containing trivalent nitrogen atoms. A suitable class of alkylene bisphenols includes compounds containing from one to four carbon atoms in the alkylene group, and having from zero to 2 alkyl substituents on each benzene ring, each alkyl substituent having from 1 to 4 carbon atoms. The preferred alkylene bisphenols are 2,2′-methylene bis (-4 methyl-6-tertiary butyl phenol) and 4,4'-butylidene bis- (6 tertiary butyl-3-methyl phenol). Suitable phenolic stabilizers other than alkylene bis-phenols include 2,6-ditertiary butyl-4-methyl phenol, octyl phenol and p-phenyl phenol.

Suitable scission inhibitors for the preferred copolymers include carboxylic polyamides, polyurethanes, substituted polyacrylamides, polyvinyl pyrrolidone, hydrazides, compounds having 1 to 6 amide groups, proteins, compounds having teritary amine and terminal amide groups, compounds having amidine groups, cycloaliphatic amine compounds and aliphatic acylureas. Suitable scission inhibitors as well as suitable antioxidants and proportions are disclosed in application Ser. No. 826,115 filed by Dolce on July 10, 1959, application Ser. No. 831,720 filed by Dolce, Berardinelli and Hudgin on Aug. 5, 1959, application Ser. No. 258,126, continuation-in-part of application Ser. No. 838,427, filed by Berardinelli on Sept. 8, 1959, application Ser. No. 838,832, filed by Dolce and Hudgin on Sept. 9, 1959, application Ser. No. 262,348 continuation-in-part of application Ser. No. 841,690, filed by Kray and Dolce on Sept. 23, 1959, application Ser. No. 256,146 continuation-in-part of application Ser. No. 851,560, filed by Berardinelli, Kray and Dolce on Nov. 9, 1959, U.S. Patent 3,133,896 of Dolce and Berardinelli, issued May 19, 1964, and application Ser. No. 4,881 filed by Kray and Dolce on Jan. 27, 1960. The disclosures of the above-mentioned patents and applications are incorporated herein by reference.

One suitable method of incorporation of the chemical stabilizers is by blending a dry solid stabilizer into the plastic polymer while the latter is being kneaded as on heated rolls or through an extruder.

Molding powders comprising pellets of stabilized polymer may be prepared by conventional pelleting procedures such as extrusion of the polymer into cylindrical extrudates which may range in diameter from about $\frac{1}{16}$" to about $\frac{1}{4}$" followed by chopping the extrudates into lengths which may range from about $\frac{1}{16}$" to about $\frac{1}{4}$".

The oxymethylene polymeric products provided by the processes described herein are of block or graft polymeric form, i.e. the polymeric segments are bonded to the termini of the original polymeric block to form a linear block copolymer, or may be bonded to the polymeric block at intermediate loci along the polymeric chain giving rise to a graft copolymer. The type of polymeric product may be governed by the position, availability and reactivity of the active hydrogen atoms contained by the polymeric segments.

For example, a primarily linearly chain extended block copolymeric product is formed where the only active hydrogen atoms are bonded to the termini of the polymeric chain. Of course, the chain may also comprise polymeric segments of random form, where one of the original polymer chains consists of a random copolymer.

The preferred polymeric products of this invention are normally solid, moldable, and thermoplastic, but may be capable of further cross-linking where a polyfunctional coupling agent has been utilized or where further reactive groups are available on the polymeric chains. Elastomeric products, for example, may be prepared by the use of a suitable co-polymer block, and preferably with a polyfunctional coupling agent. The block copolymer products may, of course, include more than one type of oxymethylene polymer segment or copolymeric segment (e.g. a block copolymer of polyoxymethylene, polyester, and polyamide segments), and the polymer block segments may themselves be of random, block or graft structure (e.g. a polybutadiene carrying grafted segments of polyacrylonitrile and polystyrene). The polymeric segments may also be of high or low molecular weight (e.g. a block copolymer of a high molecular weight polyoxymethylene segment and a low molecular weight polyamide segment). Any suitable plasticizers, fillers, additives, dyes or other coloring agents may be incorporated with the polymer by any conventional means.

Inherent viscosities, except as otherwise indicated, were determined as a 0.1% solution in a 98% p-chlorophenol —2% α-pinene solution at 60° C. Crystalline melting points were taken on a Kofler hot stage microscope. All parts are by weight except as otherwise indicated.

EXAMPLE I

Copolymers with polyalkylene glycols (A) 70 parts of a powdered oxymethylene copolymer of trioxane and ethylene oxide, of molecular weight about 32,000 (as shown from infrared determination of OH end groups assuming 2 OH's per chain), 30 parts of polyethylene glycol of molecular weight about 20,000 (Carbowax 20M) and 0.7 part of tolylene diisocyanate in one liter of dimethylformamide were heated together in a flask open to the atmosphere by means of a water-cooled condenser, a nitrogen atmosphere was bled through the system throughout the run with stirring at 155° C. for four hours. The fluid mass was cooled to a slurry at room temperature, filtered, washed twice with two liters of hot water and twice with acetone, and dried to constant weight at 70° C. 75 grams of washed solid were recovered, equal to a weight gain of 7%, based upon the oxymethylene polymer.

A 5 gram sample of this product was extracted exhaustively with hot water for 65 hours in a Soxhlet extractor to insure complete removal of polyglycol. The product exhibited an inherent viscosity, determined as a 0.1% solution in 98% p-chlorophenol-2% α-pinene of 1.7, a specific gravity of 1.383, and a crystalline melting point, determined on a hot stage polarizing microscope of 165–168° C. The original oxymethylene copolymer had an inherent viscosity of 1.4, a specific gravity of 1.417, and a crystalline melting point of 164–167° C.

Carbon and hydrogen analyses taken on the original oxymethylene copolymer and the resulting product compared as follows:

| | Original Oxymethylene Copolymer | Product |
|---|---|---|
| Percent carbon calculated | 40.3 | *41.4 |
| Percent carbon found | 39.9 | 41.7 |
| Percent hydrogen calculated | 6.8 | *6.9 |
| Percent hydrogen found | 6.8 | 7.1 |

*Minimum.

The increase in inherent viscosity and carbon hydrogen content corroborated the incorporation evidenced by the increased weight of the resulting product.

The product, stabilized with 0.5% 2,2$^1$ methylene bis (4 methyl-6 tertiary butyl phenol) and 0.1% cyanoguanidine was molded at 190° C. for 5 minutes in a 20 ton press into a 3" x 3" x 60 mil plate and cut into a tensile impact bar which exhibited a Rockwell hardness of 46, a tensile impact of 80 ft.-lb./in.$^2$ and an $H_2O$ absorption (percent in 24 hours) of 2.0. A tensile impact bar prepared in an identical fashion from the original oxymethylene copolymer exhibited a Rockwell hardness of 76, a tensile impact of 55 ft.-lb./in.$^2$, and an $H_2O$ absorption of 0.5.

8 mil films of the original oxymethylene copolymer and the product material were prepared by pressing at 190° C. and 20 tons pressure as above, and painted with a polyethylene red paint "Gemglo." Both films resisted paint removal successfully upon applicaiton and removal of an adhesive strip. The block copolymer exhibited superior paint adhesion properties in the resistance to removal by scratching the surface with a sharp object.

(B) 14 parts of an oxymethylene copolymer of trioxane and ethylene oxide containing about 0.1% of terminal hydroxyl groups, and having an inherent viscosity of 1.27; 6 parts of a polyethylene glycol of molecular weight about 20,000; 0.28 part of tolylene diisocyanate in 150 milliliters of dimethyl formamide; and 10 ml. of tributyl amine, were heated together in a 250 ml. flask fitted with a condenser and drying tube and $N_2$ inlet at a temperature of 135° C. for 3 hours. After a hot water wash, an acetone wash and hot water extraction for two days, 14.2 grams of solid dried to constant weight was recovered. Inherent viscosity of the product was 1.42.

(C) The run was repeated in an identical fashion with "Carbowax 20M," except that no tributylamine was added. The inherent viscosity of the resulting solid was 1.58.

(D) 30 parts of an oxymethylene copolymer of trioxane and ethylene oxide, having terminal hydroxyl groups and an inherent viscosity of 0.22, 30 parts of polyethylene glycol having a molecular weight about 4000, and 3.13 parts of diphenyl methane-4,4¹-diisocyanate, were heated to melt at 210° C. and reacted for 120 minutes. An overall 60% yield of solid was recovered after Soxhlet extraction for 3 days, having an inherent viscosity of 0.67.

EXAMPLE II

Copolymers with polyesters (A) 7.8 parts of an oxymethylene copolymer of trioxane and ethylene oxide, containing free hydroxyl groups and having an inherent viscosity of 0.26, 5 parts of a 2:1 ethylene glycol/propylene glycol adipate ("RCA-D6," manufactured by the Rubber Corporation of America) having a hydroxyl number of 35.2 and a number average molecular weight of about 3300, 0.49 part of tolylene diisocyanate in 100 ml. of dimethyl acetamide, and 3 drops of tributyl amine as a catalyst, were heated together at 135° C. for 7 hours. The solution was cooled, precipitated and filtered, washed with ether, and extracted with acetone in a Soxhlet extractor for 16 hours. 8 grams of a cream-colored solid was recovered, having an inherent viscosity of 0.80, and a crystalline melting point of 161° C. The product gave a carbon-hydrogen analysis corresponding to a copolymer containing 23% polyester.

(B) In a similar experiment, 9.42 parts of an oxymethylene copolymer having an inherent viscosity of 0.33, 5 parts of a 2:1 ethylene glycol/propylene glycol adipate, having an inherent viscosity of about 0.1, 0.49 parts of tolylene diisocyanate in 5 ml. of dimethyl acetamide, and 0.1 ml. of tributylamine were heated together at 135° C. for 7 hours in a 250 ml. round bottom flask with nitrogen bleed. The resulting solid product was recovered by precipitation and filtration and washed with acetone. 7.5 grams of a tan solid was recovered (representing approximately a 50% yield) having an inherent viscosity of 0.44.

(C) 30 parts of an oxymethylene copolymer of trioxane and ethylene oxide, having terminal hydroxyl groups and an inherent viscosity of 0.22, 30 parts of a 2:1 ethylene glycol/propylene glycol adipate having a molecular weight of about 3300 and 3.75 parts of diphenyl methane-4,4¹-diisocyanate, were heated to melt at 210° C. and reacted for 30 minutes. The product was Soxhlet extracted with acetone for 2 days to an overall 95% yield of a light brown rubbery solid, having an inherent viscosity of 0.99. 2½" discs of the product were compression molded at 190° C. and 20,000 lb. pressure for 5 minutes.

An identical run yielded a rubbery solid with an inherent viscosity of 1.01. Carbon-hydrogen analyses indicated a 50% polyester incorporation.

(D) In a similar experiment, 50 parts of 0.90 I.V. oxymethylene copolymer ("Celcon"), 5 parts of polyester ("RCA-D6"), and 1.0 part of diphenyl methane 4,4¹-diisocyanate were reacted at 210° C. in the melt for 60 minutes. A 2 day Soxhlet extraction with acetone gave a 90% overall yield of rubbery polymer having an inherent viscosity of 1.08.

(E) A 95% "Celcon"—5% "RCA-D6" block copolymer was similarly prepared from "Celcon" acetal copolymer of inherent viscosity 0.65 by urethane formation with diphenyl methane 4,4¹-diisocyanate in the melt at 190° C. The yield after extraction with acetone was 99% of a solid having an inherent viscosity of 1.34, which was compression molded at 190° C. and 20,000 lb. pressure to a 2½ inch disc.

(F) 5 parts of a trioxane-ethylene oxide copolymer of 0.32 inherent viscosity, 50 parts of a 2:1 ethylene glycol/propylene glycol adipate of 3300 m.w. was reacted with 4.43 parts of diphenyl methane-4,4¹-diisocyanate in the melt at 170° C. for 12 minutes. The rubbery product was insoluble in hot dimethyl-formamide and dimethyl acetamide and in other common organic solvents.

(G) 6 parts of polyethylene terephthalate having an inherent viscosity of 0.4, 5 parts of an oxymethylene copolymer of trioxane and ethylene oxide, having an inherent viscosity of 1.09, 0.174 parts of tolylene diisocyanate in 1 ml. of dimethyl formamide, and 0.1 ml. of tributylamine, were heated together in a 250 ml. flask fitted with a condenser and a nitrogen bleed at 135° C. for 2 hours. A 95% overall yield of solid product was recovered after extraction with methanol.

EXAMPLE III

Copolymers with cellulose acetate 10 parts of degraded cellulose triacetate having an inherent viscosity of about 0.2 and a hydroxyl content of 0.5%, 8.05 parts of an oxymethylene copolymer of trioxane and ethylene oxide, having an inherent viscosity of 0.28, and 0.6 part of tolylene diisocyanate in 100 ml. of dimethyl acetamide were heated together at 135° C. for 5½ hours. A brown solid product was recovered which after a two day Soxhlet extraction with acetone gave a 53% overall yield of a solid having a crystalline melting point of 164° C., and an inherent viscosity of 0.34.

EXAMPLE IV

Copolymers with polycarbonates 10 parts of "Lexan" (a polycarbonate of bis-phenol A and phosgene sold by General Electric) having an inherent viscosity of 0.45, 10 parts of an oxymethylene copolymer of trioxane and ethylene oxide having an inherent viscosity of 1.09, 0.26 part of tolylene diisocyanate in 150 ml. of dimethyl formamide, and 0.15 ml. of tributyl amine were heated together in a 250 ml. flask with a nitrogen atmosphere at 135° C. for 2 hours. Solid product recovered by precipitation was exhaustively extracted with tetrahydrofuran in a Soxhlet extractor for 16 hours. A 51% overall yield of solid product was recovered, having an inherent viscosity of 0.84.

EXAMPLE V

Copolymers with styrene

Hydroxyl terminated styrene polymer (prepared by emulsion polymerization using an $FeSo_4/H_2O_2$ catalyst system) having an inherent viscosity of 0.72, was reacted in the melt with diphenyl methane-4,4¹-diisocyanate and a trioxane-ethylene oxide copolymer having an inherent viscosity of 0.40. A 76% overall yield of a 2/1 oxymethylene/styrene block copolymer having an inherent viscosity of 1.15 and a birefringent melting point of 166° C., was recovered following Soxhlet extraction with benzene.

EXAMPLE VI

Oxymethylene isocyanate prepolymers (A) Preparation of isocyanate terminated oxymethylene polymer.

10 parts of a degraded oxymethylene copolymer of trioxane and ethylene oxide having an inherent viscosity of 1.09, 122 parts of tolylene diisocyanate and 0.3 ml. of tributyl amine, were heated together at 150° C. for one hour. The product (preserved from moisture at all times) was precipitated into petroleum ether and washed with dry acetone twice. It was further extracted with dry acetone in a Soxhlet fitted with a drying tube. It was preserved in a dry atmosphere for further use.

(B) Copolymerization of isocyanate terminated oxymethylene polymer with cellulose acetate.

9 parts of an isocyanate terminated oxymethylene copolymer (prepared as exemplified in Example VI-A above), having an inherent viscosity of 0.28, 10 parts of degraded cellulose triacetate, having a hydroxyl content of 0.5%, and an inherent viscosity of 0.2, and 0.1 ml. of tributylamine, in 100 ml. of dimethyl acetamide, were heated together in a 250 ml. flask with a nitrogen atmosphere at 135° C. for 19 hours. The resulting brown solid was exhaustively extracted in a Soxhlet with acetone and methylene chloride for 16 hours. A 52% overall yield of solid product was recovered, having an inherent viscosity of 0.31.

EXAMPLE VII

*Polycarbonate isocyanate prepolymers*

(A) Preparation of isocyanate terminated carbonate polymer.

10 grams of "Lexan," a polycarbonate of bis-phenol A and phosgene, having an inherent viscosity of 0.47, 122 parts of tolylene diisocyanate and 10 ml. of tributyl amine were heated together at 140° C. for 0.7 hour. The solution was then cooled and precipitated with petroleum ether. The product was filtered and washed thoroughly with more petroleum ether.

(B) 10 parts of the isocyanate terminated polycarbonate, 9 parts of a hydroxy terminated oxymethylene copolymer of trioxane and ethylene oxide having an inherent viscosity of 1.09, and 10 ml. of tributylamine in 180 ml. of dimethyl formamide were heated together in a 500 ml. round bottom flask with nitrogen atmosphere at 140° C. for 1½ hours. Following extraction with methylene chloride, 9.2 grams of solid (representing a 48% overall yield) were recovered, having an inherent viscosity of 1.08.

It is to be understood that the foregoing detailed description is given merely by way of illustration and that many variations may be made therein without departing from the spirit of the invention.

The embodiments of the invention in which an exclusive property or privilege is claimed are defined as follows:

1. Copolymers having the structure

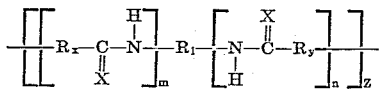

wherein $R_x$ is the residue of an oxymethylene polymer segment having terminal groups containing at least one active hydrogen atom as determined by the Zerewitnoff method, $R_y$ is the residue of a dissimilar organic polymer segment having terminal groups containing at least one active hydrogen atom as determined by the Zerewitnoff method, X is an atom selected from the group consisting of oxygen and sulfur atoms, $R_1$ is an organic radical selected from the group consisting of divalent and trivalent aliphatic, cycloaliphatic, and aromatic radicals having up to about 20 carbon atoms, $m$ and $n$ are integers from one to two, $m+n$ is an integer from two to three, and $z$ is an integer from one to 100.

2. A block copolymer comprising at least one block unit consisting of an oxymethylene polymer segment and at least one block unit of a polyester segment, said block units being directly bonded by a unit of the structure

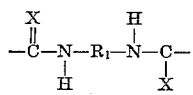

wherein $R_1$ is an organic radical selected from the group consisting of divalent and trivalent aliphatic, cycloaliphatic, and aromatic radicals having up to about 20 carbon atoms, and X is an atom selected from the group consisting of oxygen and sulfur.

3. A block copolymer comprising at least one block unit consisting of an oxymethylene polymer agent and at least one block unit of a polyalkylene glycol segment, said block units being directly bonded by a unit of the structure:

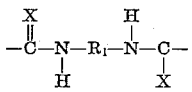

wherein $R_1$ is an organic radical selected from the group consisting of divalent and travalent aliphatic, cycloaliphatic, and aromatic radicals having up to about 20 carbon atoms, and X is an atom selected from the group consisting of oxygen and sulfur.

4. A block copolymer comprising at least one block unit consisting of an oxymethylene polymer segment and at least one block unit of a polycarbonate segment, said block units being direcly bonded by a unit of the structure:

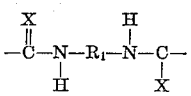

wherein $R_1$ is an organic radical selected from the group consisting of divalent and trivalent aliphatic, cycloaliphatic, and aromatic radicals having up to about 20 carbon atoms, and X is an atom selected from the group consisting of oxygen and sulfur.

5. A block copolymer comprising at least one block unit consisting of an oxymethylene polymer segment and at least one block unit of a cellulose ester segment, said block units being directly bonded by a unit of the structure:

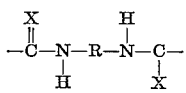

wherein $R_1$ is an organic radical selected from the group consisting of divalent and trivalent aliphatic, cycloaliphatic, and aromatic radicals having up to about 20 carbon atoms, and X is an atom selected from the group consisting of oxygen and sulfur.

6. A block copolymer comprising at least one block unit consisting of an oxymethylene polymer segment and at least one block unit of a styrene segment, said block units being directly bonded by a unit of the structure:

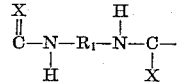

wherein $R_1$ is an organic radical selected from the group consisting of divalent and trivalent aliphatic, cycloaliphatic, and aromatic radicals having up to about 20 carbon atoms, and X is an atom selected from the group consisting of oxygen and sulfur.

7. Copolymers having the structure:

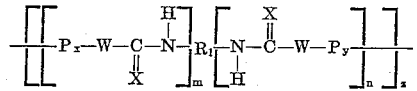

wherein $P_x$ is an oxymethylene polymer segment, $P_y$ is a dissimilar organic polymeric segment, X is an atom selected from the group consisting of oxygen and sulfur atoms, $R_1$ is an organic radical selected from the group consisting of divalent and trivalent aliphatic, cycloaliphatic, and aromatic radicals having up to about 20 carbon atoms, W is selected from the group consisting of —O—, —S—,

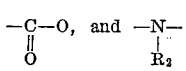

where $R_2$ is selected from the group consisting of hydrogen, halogen and alkyl having one to five carbon atoms, $m$ and $n$ are integers from one to two, $m+n$ is an integer from two to three, and Z is an integer from one to 100.

8. The copolymer of claim 7, wherein said oxymethylene polymer is an oxymethylene copolymer having at least one chain containing at least 85 mol percent of recurring oxymethylene units interspersed with up to about 15 mol percent of (—OR—) units, wherein R is a divalent radical containing at least 2 carbon atoms directly linked to each other and positioned in the chain between the two valences, with any substituent in the R radical being inert.

9. The polymer of claim 1, wherein said oxymethylene polymer is an oxymethylene copolymer having at least one chain containing at least 85 mol percent of recurring oxymethylene units interspersed with up to about 15 mol percent of (—OR—) units, wherein R is a divalent radical containing at least 2 carbon atoms directly linked to each other and positioned in the chain between the two valences, with any substituent, in the R radical being inert.

10. The block copolymer of claim 9 wherein $R_y$ is a 2:1 ethylene glycol/propylene glycol adipate having a number average molecular weight of between about 1,000 and 10,000.

11. The block copolymer of claim 9, wherein $R_y$ is polyethylene terephthalate having a number average molecular weight of between about 1,000 and 10,000.

12. The block copolymer of claim 9 wherein $R_y$ is polyethylene glycol having a number average molecular weight of between about 350 and 20,000.

13. The block copolymer of claim 9 wherein $R_y$ is the polycarbonate of phosgene and bisphenol-A having a number average molecular weight of between about 1,000 and 10,000.

14. The block copolymer of claim 9 wherein $R_y$ is cellulose acetate, having a number average molecular weight of at least 5,000.

15. The block copolymer of claim 9 wherein $R_y$ is polystyrene, having a number average molecular weight of between about 1,000 and 10,000.

References Cited

UNITED STATES PATENTS

| | | | |
|---|---|---|---|
| 3,204,012 | 8/1965 | Eguchi et al. | 260—858 |
| 3,218,295 | 11/1965 | Cline | 260—13 |
| 3,256,245 | 6/1966 | Wagner et al. | 260—858 |

WILLIAM H. SHORT, *Primary Examiner.*

T. NORRIS, *Assistant Examiner.*